United States Patent [19]
Heal et al.

[11] Patent Number: 6,056,074
[45] Date of Patent: *May 2, 2000

[54] MOWER WITH NON-CONTACT DRIVE SYSTEM INTERLOCK

[75] Inventors: Karl D. Heal, Chaska; Philip G. Staples, Hamel; Larry W. Schmidt, Farmington, all of Minn.

[73] Assignee: The Toro Company, Bloomington, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,572

[22] Filed: May 29, 1997

[51] Int. Cl.$^7$ ..................................................... B62D 11/14
[52] U.S. Cl. .......................... 180/6.48; 180/6.2; 180/336
[58] Field of Search .................................... 180/6.2, 6.48, 180/305, 336, 315; 56/11.3, 10.8

[56] References Cited

U.S. PATENT DOCUMENTS

| | | | |
|---|---|---|---|
| 4,267,544 | 5/1981 | Wiblin | 180/315 |
| 5,042,238 | 8/1991 | White, III et al. | 56/11.8 |
| 5,074,168 | 12/1991 | Ishikawa et al. | 74/878 |
| 5,496,226 | 3/1996 | Splittstoesser et al. | 180/6.2 |
| 5,507,138 | 4/1996 | Wright et al. | 56/14.7 |
| 5,600,944 | 2/1997 | Wright et al. | 56/14.7 |
| 5,649,606 | 7/1997 | Bebernes et al. | 180/307 |

OTHER PUBLICATIONS

Groundsmaster 20 HP, Traction Unit, Operator's Manual, Form No. 3318–207, *The Toro Company*, pp. 1, 18, 20, 37, 40 (1995).

Lawn–Boy—America's long–running tradition, Parts Catalog, *Lawn–Boy Inc.*, pp. 3, 8, 9 (1990).

Proline 120, Parts Catalog, Form No. 3316–457 Rev.A, *The Toro Company*, pp. 2, 16–19, 40 (1993–1994).

Proline 724–Z, Hydrostatic Mower, Parts Catalog, Form No. 3317–168, *The Toro Company*, pp. 8–9, 12–13, 34–35, 48 (1994).

Proline 724–Z, Mowing Machine, Operator's Manual, Form No. 3317–177, *The Toro Company*, pp. 8–10, 12, 24, 25, 28 (1994).

Reed Switch Application Manual, *Hamlin, Inc.*, pp. 1–31 (1991).

*Primary Examiner*—J. J. Swann
*Assistant Examiner*—Michael Cuff
*Attorney, Agent, or Firm*—Mueting, Raasch & Gerhardt, P.A.

[57] ABSTRACT

Mower drive system interlocks and methods of interlocking mower drive systems with non-contact sensors are disclosed. The mowers may include two driven ground engaging means for supporting the mower above the ground; two drive systems for driving the driven ground engaging means, one of the drive systems driving each of the driven ground engaging means independently of the other drive system and its driven ground engaging means, wherein each of the drive systems has a neutral condition in which its driven ground engaging means is not being driven by the drive system; a drive system interlock operatively connected to an engine of the mower; and two non-contact sensors operatively connected to the drive system interlock, the sensors providing a signal to the drive system interlock when both of the drive systems are in the neutral condition. The methods of interlocking a mower may include steps of providing a mower having a drive system interlock operatively connected to an engine, two drive systems, and two driven ground engaging means for supporting the mower above the ground that are independently driven by each of the drive systems, the drive systems each having a neutral condition in which their respective driven ground engaging means are not being driven; sensing when both of the drive systems are in the neutral condition with a non-contact sensor; and providing a signal to the drive system interlock of the riding mower when the non-contact sensor senses that both of the drive systems are in the neutral condition.

23 Claims, 6 Drawing Sheets

MOWER WITH NON-CONTACT DRIVE SYSTEM INTERLOCK

FIELD OF THE INVENTION

The present invention relates to the field of walk-behind and riding mowers. More particularly, the present invention relates to mower drive system interlocks that incorporate non-contact sensors.

BACKGROUND OF THE INVENTION

Riding and walk-behind mowers with drive system interlocks are known. Typically, the interlock systems prevent operation of the mower unless certain conditions have been satisfied. Examples include whether an operator is seated on the riding mower, whether the mower deck power take off is disengaged, or whether the drive system is in neutral.

One class of riding and walk-behind mowers provides zero radius turning. Such mowers typically include two independently driven wheels that allow the mower to turn by pivoting about a vertical axis located between the driven wheels because the wheels can be driven in opposite directions at the same time. Some zero turning radius mowers employ two control levers, each of the control levers controlling the movement of each of the driven wheels. Examples of such riding mowers are the TORO® Z MASTER™ zero radius tractors.

In such a design, the operator is freed from the need to shift the drive system between forward, reverse or neutral in a separate action from steering the mower because both steering and shifting are controlled by the control levers. For example, to go forward in a straight line, the operator need only push both levers forward. Similarly, to go in reverse, the operator merely pulled both levers backward. If no force is applied to the levers, the drive system is in neutral.

The real benefit to such a control system, however, is realized during the sharp maneuvering often required when performing tight trimming operations around shrubs and other objects. Because the drive wheels can be driven in forward or reverse by changing the direction of the control levers, the operator is not required to stop, use a clutch or shift while also steering the mower.

Because these riding mowers also include interlock systems, it is necessary to determine whether the drive systems were in neutral. Typically, the monitoring the drive systems involves the use of electromechanical plunger switches in which the control levers depress a plunger to close a switch when the control levers are in the position that placed the drive wheels in neutral. Although plunger switches may typically operate with sufficient reliability in many situations, their useful life can be problematic when used in conjunction with the control levers of riding mowers including a drive motor for each driven wheel.

The reliability issue is caused in large part by the frequent cycling of each drive motor between forward and reverse. With each change between forward and reverse, the neutral plunger switch is depressed briefly by the control lever associated with that wheel as it passes through the neutral position. When the riding mowers are used to mow areas in which maneuverability is required, i.e., the wheels are repeatedly being driven in forward and reverse, the plunger switches can be cycled many times.

Another potential problem is that, because the control levers are mounted to pivot during movement between forward and reverse, they typically pass the plunger switch along a path that is generally transverse to the axis of activation of the plunger switch, i.e., the axis along which the plunger switch is designed to move during operation. As a result, the plunger switch is subjected to an off-axis force that may reduce its useful life as compared to applications in which the plunger switch is depressed along its axis of activation.

The above problems are exacerbated due to the generally dirty environment in which the plunger switches operate. The switches can quickly become covered with dirt, grass clippings, water, oil, grease etc. That contamination can cause the seals in the plunger switch to fail early, thereby necessitating replacement of the switch.

SUMMARY OF THE INVENTION

The present invention provides mower drive system interlocks and methods of interlocking mower drive systems with non-contact sensors. Using non-contact sensors for such interlock systems provides advantages such as an improved service life as compared to plunger switches and other mechanically actuated switches.

Non-contact drive system interlocks are particularly advantageous when used in combination with riding and walk-behind mowers having two independently driven wheels, such as zero turning radius mowers. As described above, the drive systems of such mowers typically involve movement of the control mechanisms through neutral when moving between forward and reverse for steering. As a result, the sensor is activated whenever each motor is cycled between forward and reverse to steer the riding mower (as compared to more conventional drive systems in which steering is performed independently of the drive system).

In one aspect, the present invention provides a mower including two driven ground engaging means for supporting the mower above the ground; two drive systems for driving the driven ground engaging means, one of the drive systems driving each of the driven ground engaging means independently of the other drive system and its driven ground engaging means, wherein each of the drive systems has a neutral condition in which its driven ground engaging means is not being driven by the drive system; a drive system interlock operatively connected to an engine of the mower; and two non-contact sensors operatively connected to the drive system interlock, the sensors providing a signal to the drive system interlock when both of the drive systems are in the neutral condition.

In another aspect the present invention provides a mower including two driven wheels supporting the mower; two hydrostatic drive systems for driving the driven wheels, one of the drive systems driving each of the driven wheels independently of the other drive system and its driven wheel, wherein each of the drive systems has a neutral condition in which its driven wheel is not being driven by the drive system; two control mechanisms for shifting the drive systems between forward, reverse and the neutral condition, each of the drive systems being controlled by one of the control mechanisms, wherein the control mechanisms move the drive systems through the neutral condition when shifting the drive systems between forward and reverse; a drive system interlock operatively connected to an engine of the mower; and two non-contact sensors operatively connected to the drive system interlock, the non-contact sensors providing a signal to the drive system interlock when both of the drive systems are in the neutral condition.

In another aspect the present invention provides a method of interlocking a mower including providing a mower having a drive system interlock operatively connected to an engine, two drive systems, and two driven ground engaging means for supporting the mower above the ground that are independently driven by each of the drive systems, the drive systems each having a neutral condition in which their respective driven ground engaging means are not being driven; sensing when both of the drive systems are in the neutral condition with a non-contact sensor; and providing a signal to the drive system interlock of the riding mower when the noncontact sensor senses that both of the drive systems are in the neutral condition.

In another aspect the present invention provides a method of interlocking a mower comprising providing a mower having a drive system interlock operatively connected to an engine, two hydrostatic drive systems, and two driven wheels that are independently driven by each of the drive systems, the drive systems each having a neutral condition in which their respective driven wheels are not being driven; independently controlling each of the drive systems with a separate control mechanism for shifting each of the drive systems between forward, reverse and the neutral condition, wherein each of the control mechanisms move each of the drive systems through the neutral condition when shifting the drive systems between forward and reverse; sensing when each of the drive systems are in the neutral condition with a non-contact sensor for each of the drive systems; and providing a signal to the drive system interlock of the riding mower when the non-contact sensors sense that both of the drive systems are in the neutral condition.

These and other features and advantages of the present invention will be discussed below in connection with preferred embodiments of the invention.

DETAILED DESCRIPTION OF THE INVENTION

Figure 1:
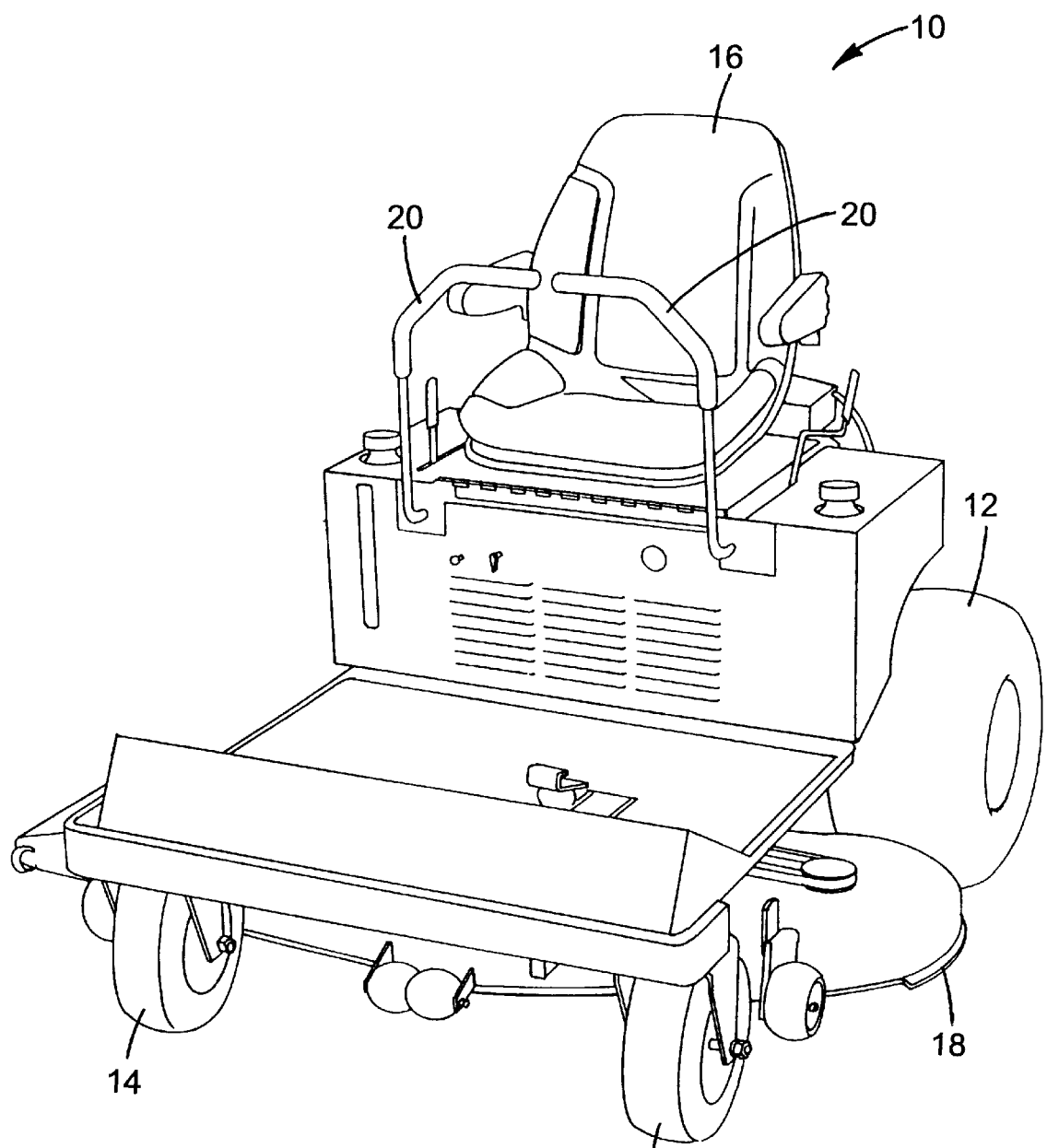
FIG. 1 is a perspective view of one riding mower including a drive system interlock according to the present invention.

FIG. 1 depicts one riding mower 10 including a drive system interlock according to the present invention. The riding mower 10 includes a pair of driven wheels 12 and a pair of caster mounted follower wheels 14. In use, the driven wheels 12 are used to move the riding mower 10 and follower wheels 14 support the front end of the riding mower 10. The riding mower 10 also includes a seat 16 for an operator and a pair of control levers 20 used to control each of the driven wheels 12. The levers 20 are depicted in the use position in which they are located in front of the operator (not shown). It will be understood that the top of the control levers 20 can be rotated outward to allow the operator to dismount or mount the seat 16.

Figure 2:
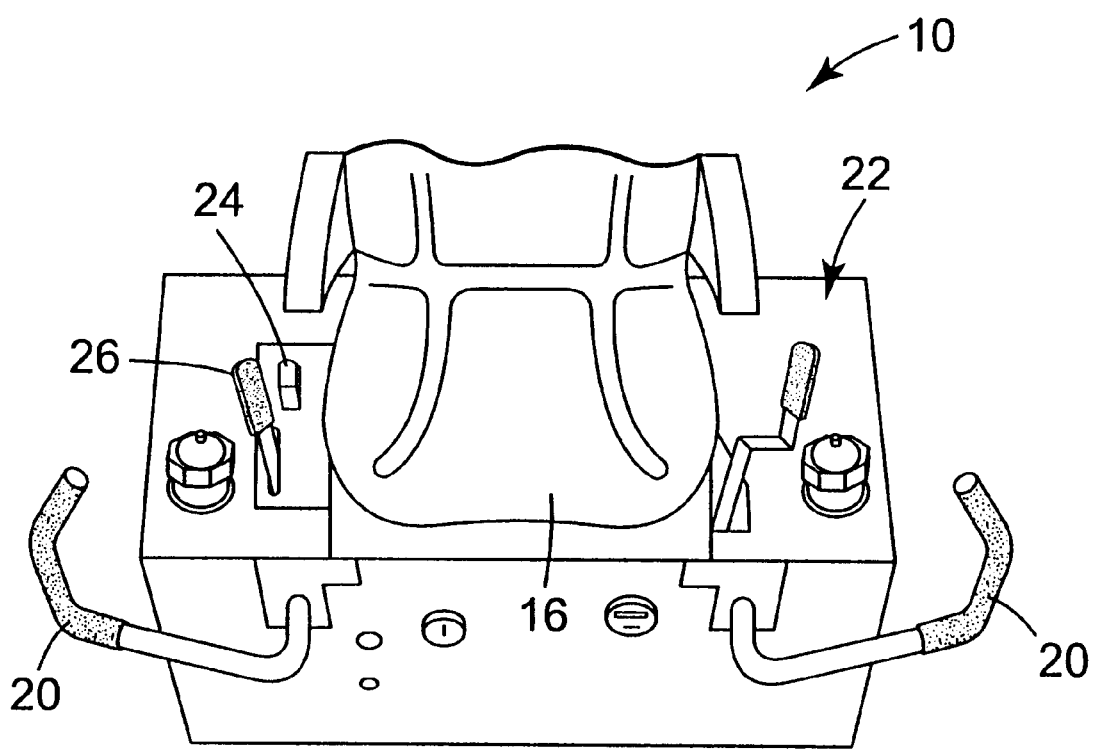
FIG. 2 is a perspective view of a portion of the riding mower of FIG. 1.

FIG. 2 is a schematic depiction of a portion of the riding mower 10 of FIG. 1. In this view, the control levers 20 are depicted in an outboard position, i.e., a position in which the operator can mount the seat 16 without interference from the control levers 20. In use, the control levers 20 can be rotated inward to allow the operator to move them forward and backward to put the driven wheels in forward or reverse.

Also depicted in FIG. 2 are a parking brake lever 22 used to activate and deactivate the parking brake of the riding mower 10. The power take off control 24 is also depicted in FIG. 2 which engages or disengages the power take off which is typically used to drive the blades in the mower deck 18 (see FIG. 1) of the riding mower 10. A throttle control lever 26 for the engine of the riding mower 10 is also depicted in FIG. 2.

As used in connection with the present invention, the term "mower" includes both riding mowers in which the operator is seated or standing on the mower, as well as walk-behind mowers in which the operator walks with the moving mower.

Also, although the riding mowers depicted in FIGS. 1 and 2 include two independently driven wheels supporting the mower, it will be understood that mowers or other driven equipment according to the present invention could include any driven ground engaging means for supporting the mower or other device above the ground including, but not limited to: wheels, tracks, and any other equivalent mechanism or structure considered a substitute to those skilled in the art.

Figure 3:
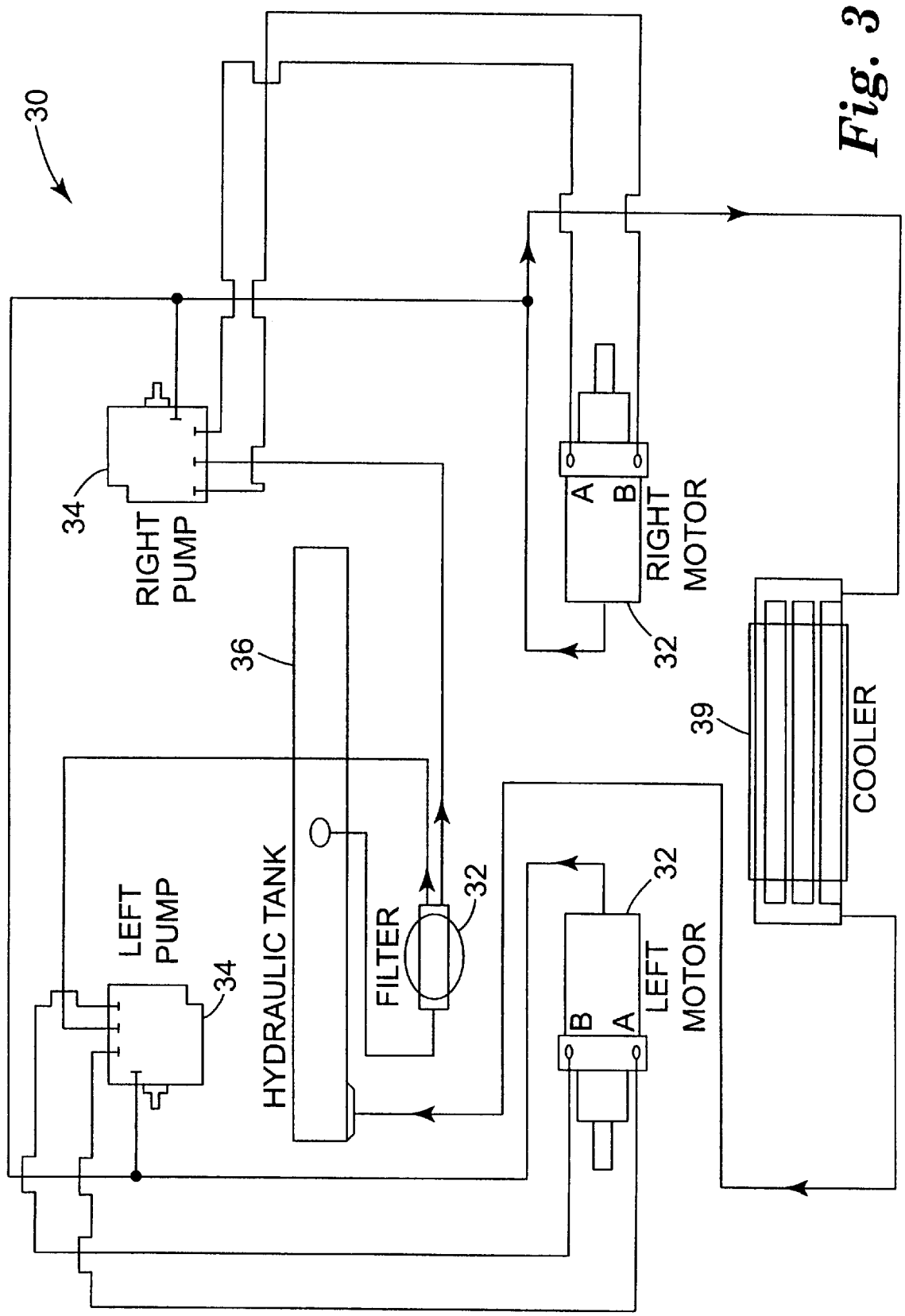
FIG. 3 is a schematic diagram of one hydraulic drive system for a riding mower according to the present invention.

FIG. 3 is a schematic diagram of one preferred hydrostatic drive system 30 for riding mowers including a drive system interlock according to the present invention. The drive system 30 includes a hydraulic motor 32 for each driven wheel (the depicted drive system 30 is designed for a mower including two driven wheels). Each of the motors 32 is in fluid communication with its own hydraulic pump 34. The depicted hydraulic system 30 includes a hydraulic fluid tank 36. The system 30 also preferably includes a filter 38 and a cooler 39 as is common with most hydraulic power systems.

It will be understood that although preferred hydrostatic drive systems will include separate pumps for each of the drive motors, a single pump and appropriate valves could be substituted to allow each of the driven wheels or other ground engaging means to be independently driven from the single pump.

Figure 4:
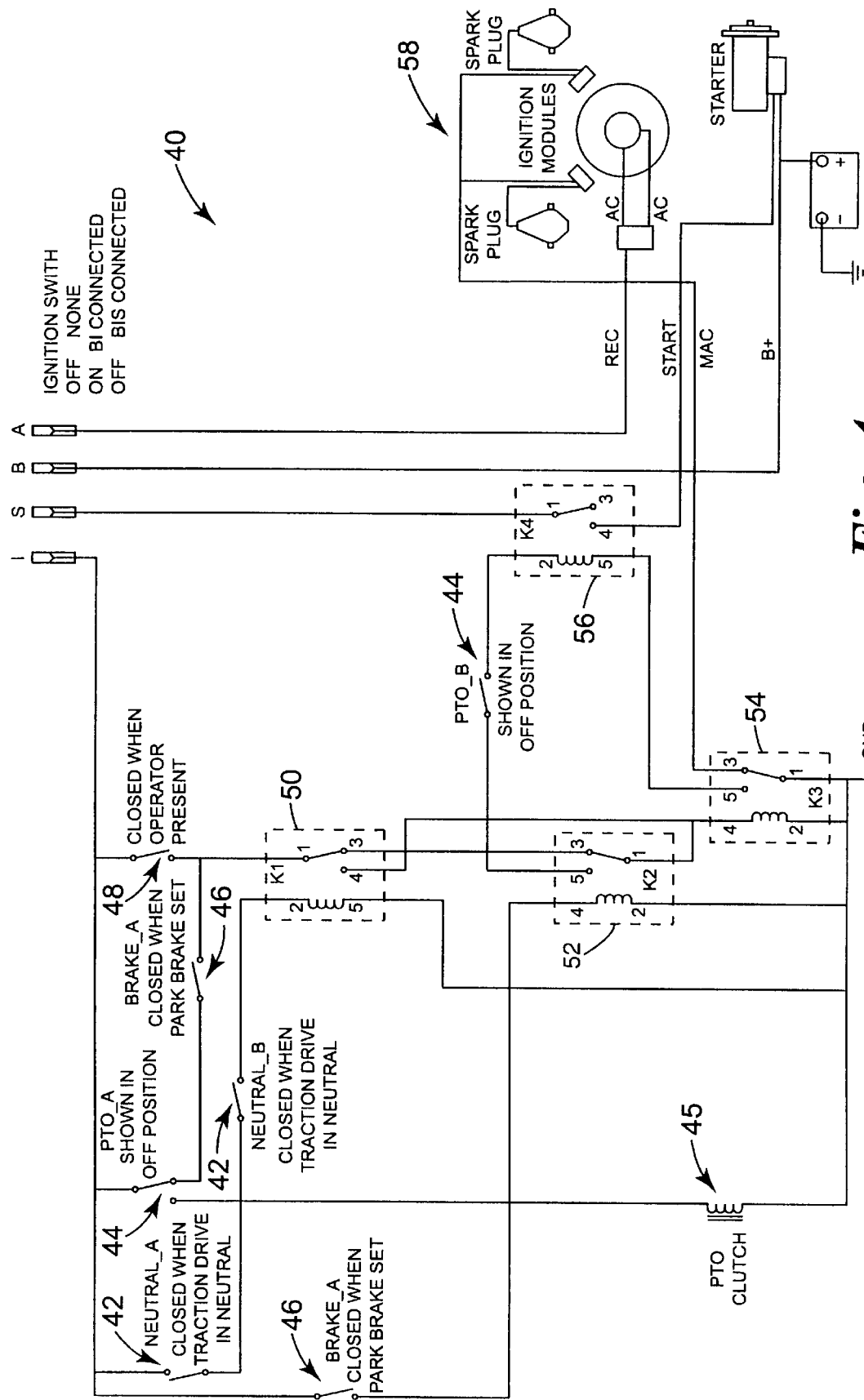
FIG. 4 is a schematic diagram of the electrical system including a drive system interlock according to the present invention.

FIG. 4 is a schematic diagram of one preferred electrical system 40 for a riding mower incorporating a drive system interlock according to the present invention. The system 40 includes a pair of drive system switches 42 used to indicate whether the drive systems for each of the wheels are in the neutral condition. The preferred drive system switches 42 are normally open. If the drive systems are in the neutral condition, the drive system switches 42 are closed. Those of skill in the art will, however, understand that the switches 42 could be normally closed with corresponding changes to the remainder of the electrical system 40, but are preferably normally open.

The condition of the power take off unit is monitored in the system 40 by power take off switch 44. In the preferred mowers, the power take off switch 44 closes a circuit that provides power to an electric clutch 45 to operate a mower deck. Parking brake switches 46 are closed when the parking brake of the riding mower is engaged. Seat switch 48 is normally open, but closes when sufficient pressure is placed on the seat (typically corresponding to a seated operator).

The various switches 42, 44, 46 and 48 combine with a series of relays 50, 52, 54 and 56 to provide one preferred embodiment of an interlock system for a riding mower. The interlock system preferably prevents the engine 58 from starting or shuts down the engine if the interlock system is tripped. The interlock system incorporated into electrical system 40 will typically operate as described below.

The engine 58 will be prevented from starting unless the parking brake is engaged as indicated by parking brake switches 46, the power take off unit is disengaged as indicated by power take off unit switch 44, and the drive system 30 is in neutral as indicated by drive system switches 42. The engine 58 will also be stopped if the either of the drive systems are moved out of neutral with the parking brake engaged as indicated by the drive system switches 42 and parking brake switches 46. Opening of the seat switch 48 (typically caused by the operator leaving the seat of the riding mower) when the power take off unit is engaged as indicated by power take off switch 44 will also cause the engine 58 to stop. Opening of the seat switch 48 with either of the drive system switches 42 indicating that at least one of the drive systems is not in neutral will also cause the engine 58 to stop.

The use of the interlock system to stop the engine 58 if the drive system 30 is moved out of neutral with the parking brake engaged as indicated by the drive system switches 42 and the parking brake switches 46 is particularly advantageous in connection with a hydrostatic drive system 30 as depicted in FIG. 3. The drive system 30 will typically be capable of driving wheels connected to the motors 32 in spite of the engagement of the parking brake. By interconnecting the parking brake and the drive system to stop the engine when the drive system is moved out of neutral with the parking brake engaged, the movement of the riding mower by the drive system in spite of the engagement of the parking brake may be prevented.

Figure 5:
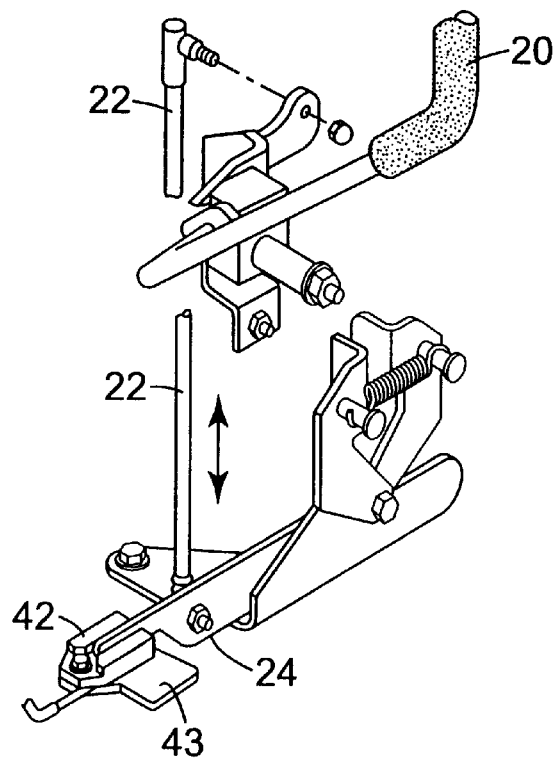
FIG. 5 is a perspective view of one non-contact sensor mechanism for use in a mower drive system interlock according to the present invention.
Figure 6:
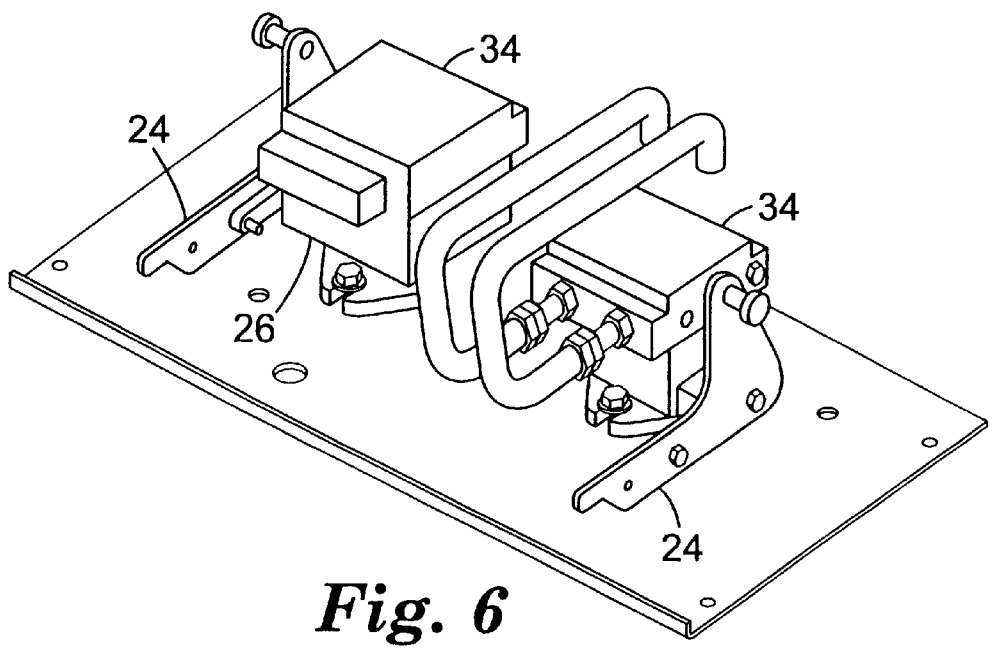
FIG. 6 is a perspective view of the connection of the mechanism of FIG. 5 with a hydraulic drive system of one mower.

FIGS. 5 and 6 depict one non-contact sensor mechanism for use in a riding mower drive system interlock and the connection of the sensor mechanism with a hydraulic drive system. One of the control levers 20 used to control movement of one of the driven wheels of a riding mower is shown in FIG. 5. The control lever 20 is shown in the outboard position as indicated above with respect to FIG. 2. Movement of the control lever 20 causes link rod 22 to move generally vertically as shown by arrows 24. The link rod 22 is connected to follower arm 24 to cause movement of the follower arm 24 as the link rod 22 is raised or lowered. Each follower arm 24 is operatively connected to the control arm 26 of its respective hydraulic pump 34.

As a result, movement of the control lever 20 causes movement of the control arm 26 for the hydraulic pump 34. That movement of the control arm 26 causes, in turn, the drive system 30 to drive the motor 32 in the desired direction. It will be understood that the mechanism depicted in FIGS. 5 and 6 represents only one suitable embodiment and that other mechanisms for coupling movement of the control levers to movement of the associated driven wheel are possible within the scope of the present invention.

The present invention incorporates a non-contact sensor for determining whether the drive system is in the neutral condition. Because of the nature of the preferred hydraulic drive system 30, a non-contact sensor is preferable because of its extended operating life as compared to a mechanical plunger switch. The problems of mechanical plunger switches used to indicate the neutral condition of the drive system 30 is described above in more detail.

One preferred non-contact sensor 42 is depicted in FIG. 5. The sensor 42 is preferably a magnetic reed switch that is normally open and is closed when a portion of the follower arm 24 is located near the sensor 42. More preferably, the sensor is activated when the follower arm 24 is located between the arms of the sensor 42. By using a magnetic reed switch for sensor 42, the problem of dirt and contamination of the sensor 42 can be minimized because the sensor 42 is only sensing the presence of ferromagnetic material and the presence of contaminants such as grass, dirt, water, oil, grease, etc. will generally not affect operation of the sensor 42.

In the preferred embodiment, the follower arm 24 is preferably made of a ferrous material to activate the preferred magnetic reed switch in sensor 42. Alternatively, a magnet or other ferromagnetic material could be added to the follower arm 24 to provide for activation. When the sensor 42 is the preferred magnetic reed switch, the sensor 42 is preferably mounted on a non-ferromagnetic base 43 to prevent spurious or unwanted activation of the sensor 42. In the preferred embodiment, the sensor 42 is mounted on an aluminum plate bolted to the riding mower.

Although one preferred application of the interlock system of the present invention is in mowers, it should be understood that the present invention can find application in any driven equipment that includes two independently driven wheels or other ground engaging means. The use of two independently controlled wheels or other ground engaging means provides such devices with the ability to provide a zero turning radius to improve maneuverability. In addition, where the drive systems are hydrostatic and independently controlled with, e.g., levers, the need for a clutch to move between forward and reverse can be eliminated, thereby further improving the speed at which the device can be operated in situations requiring frequent changes in direction. Some examples of other types of driven equipment that could be used in connection with the present invention are snowthrowers and hydrostatically driven front end loaders (sometimes referred to as skid-steer loaders).

Figure 7:
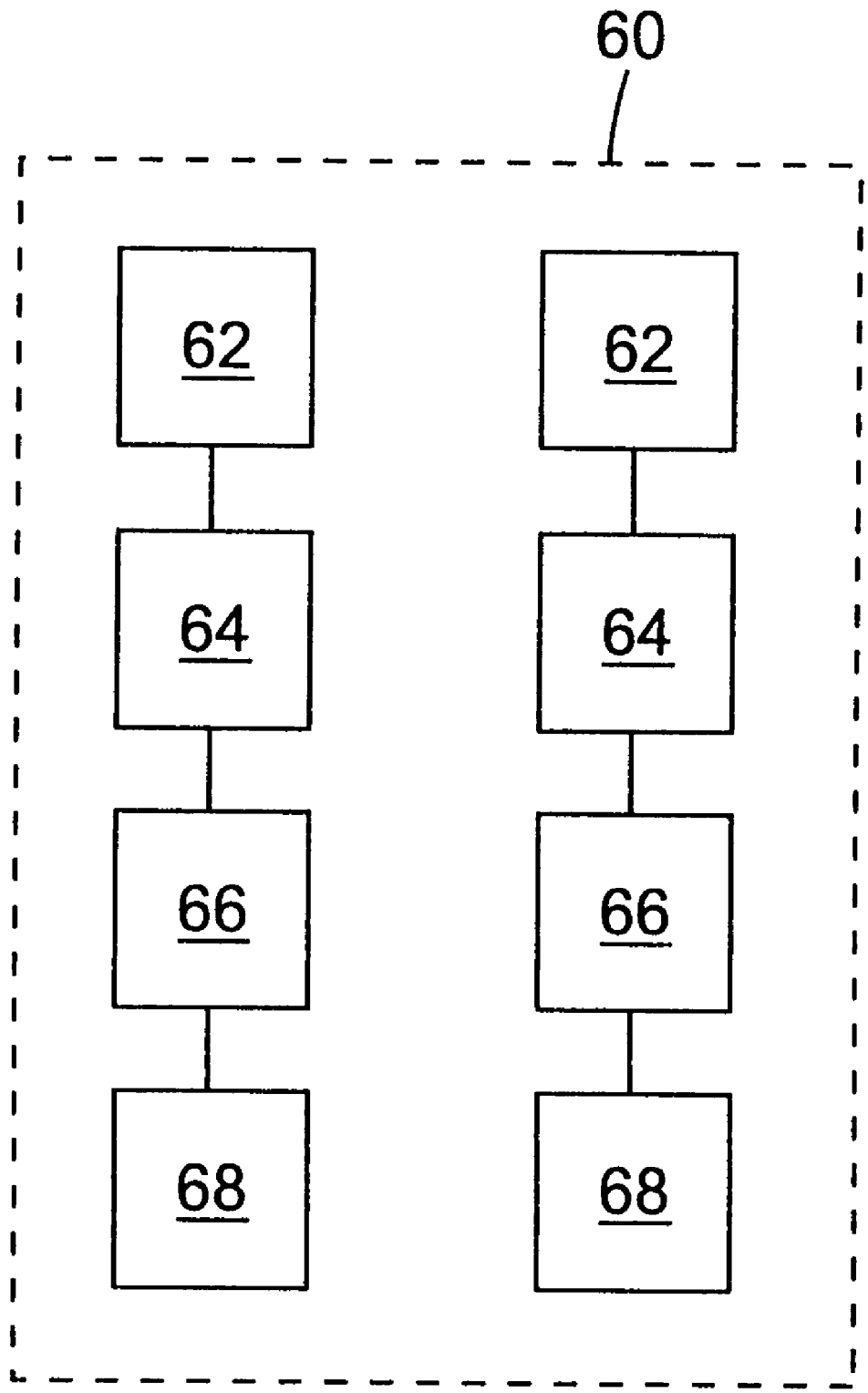
FIG. 7 is a schematic block diagram of one embodiment of driven equipment that includes two independently driven ground engaging means according to the present invention.

FIG. 7 illustrates such a device 60 in a schematic block diagram including two ground engaging means 62. The ground engaging means 62 are each independently driven by a drive system 64. Preferably, each of the drive systems 64 is operated by a control 66 that passes through neutral as it cycles between forward and reverse during operation of the device 60. Two non-contact sensors 68, one for each of the drive systems 64, are used to indicate when the drive systems 64 are in the neutral condition (although those skilled in the art will understand that one non-contact sensor 68 may be used to indicate that both of the drive systems 64 are in neutral).

The preceding specific embodiments are illustrative of the present invention. It is to be understood, therefore, that variations known to those skilled in the art or disclosed herein may be employed without departing from the invention or the scope of the appended claims. For example, although the preferred embodiment employs a magnetic reed switch in the non-contact sensor, it will be understood that photocell, Hall Effect sensor, ultrasonic sensor, or other non-contact sensor could be used in place of the preferred magnetic reed switch. Likewise, although the riding mowers discussed above employ hydraulic drive systems, it will be understood that other drive systems, e.g., electric motors, could be used in place of the preferred hydraulic motors.

In the claims, means-plus-function clauses are intended to include the structures described herein as performing the recited function, structural equivalents thereof, and also equivalent structures. For example, although a nail and a screw may not be structural equivalents in that a nail employs a cylindrical surface to secure wooden parts together, whereas a screw employs helical threads, in the environment of fastening wooden parts a nail and a screw should be considered equivalent structures.

What is claimed is:

1. A mower comprising:
   a) two driven ground engaging means for supporting the mower above the ground;
   b) two drive systems for driving the driven ground engaging means, one of the drive systems driving each of the driven ground engaging means independently of the other drive system and its driven ground engaging means, wherein each of the drive systems has a neutral condition in which its driven ground engaging means is not being driven by the drive system, and further wherein one of the drive systems can be driven in forward while the other drive system is driven in reverse;
   c) a drive system interlock operatively connected to an engine of the mower; and
   d) two non-contact sensors operatively connected to the drive system interlock, the sensors providing a signal to the drive system interlock when both of the drive systems are in the neutral condition.

2. A mower according to claim 1, further comprising two control mechanisms for shifting the drive systems between forward, reverse and the neutral condition, each of the drive systems being controlled by one of the control mechanisms, wherein the control mechanisms move the drive systems through the neutral condition when shifting the drive systems between forward and reverse.

3. A mower according to claim 2, comprising at least one of the non-contact sensors for each of the control mechanisms.

4. A mower according to claim 3, wherein each of the control mechanisms comprises a control lever acted on by an operator and a follower that activates one of the non-contact sensors when the control lever is in a position corresponding to a neutral condition of the drive system.

5. A mower according to claim 4, wherein each of the non-contact sensors comprises a magnet and a reed switch, and further wherein each of the followers comprises ferromagnetic material.

6. A mower according to claim 1, wherein each of the drive systems comprises a hydraulic pump and a motor.

7. A mower comprising:
   a) two driven wheels supporting the mower;
   b) two hydrostatic drive systems for driving the driven wheels, one of the drive systems driving each of the driven wheels independently of the other drive system and its driven wheel, wherein each of the drive systems has a neutral condition in which its driven wheel is not being driven by the drive system, and further wherein one of the drive systems can be driven in forward while the other drive system is driven in reverse;
   c) two control mechanisms for shifting the drive systems between forward, reverse and the neutral condition, each of the drive systems being controlled by one of the control mechanisms, wherein the control mechanisms move the drive systems through the neutral condition when shifting the drive systems between forward and reverse;
   d) a drive system interlock operatively connected to an engine of the mower; and
   e) two non-contact sensors operatively connected to the drive system interlock, the non-contact sensors providing a signal to the drive system interlock when both of the drive systems are in neutral condition.

8. A mower according to claim 7, wherein each of the drive systems comprises a hydraulic pump and a motor.

9. A mower according to claim 7, wherein each of the control mechanisms comprises a control lever acted on by an operator and a follower that activates one of the non-contact sensors when the control lever is in a position corresponding to a neutral condition of the drive system.

10. A mower according to claim 8, wherein each of the non-contact sensors comprises a magnet and a reed switch, and further wherein each of the followers comprises ferromagnetic material.

11. A method of interlocking a mower comprising:
    a) providing a mower having a drive system interlock operatively connected to an engine, two drive systems, and two driven ground engaging means for supporting the mower above the ground that are independently driven by each of the drive systems, the drive systems each having a neutral condition in which their respective driven ground engaging means are not being driven, wherein one of the reverse;
    b) sensing when both of the drive systems are in the neutral condition with a non-contact sensor; and
    c) providing a signal to the drive system interlock of the riding mower when the non-contact sensor senses that both of the drive systems are in the neutral condition.

12. A method according to claim 11, further comprising a step of independently controlling each of the drive systems with a separate control mechanism for shifting each of the drive systems between forward, reverse and the neutral condition, wherein each of the control mechanisms move each of the drive systems through the neutral condition when shifting the drive systems between forward and reverse.

13. A method according to claim 12, wherein the step of sensing comprises sensing when each of the drive systems is in the neutral condition with a separate non-contact sensor.

14. A method according to claim 13, wherein the step of independently controlling each of the drive systems comprises moving a control lever and a follower that activates one of the non-contact sensors when the control lever is moved to a position corresponding to a neutral condition of the drive system.

15. A method according to claim 14, wherein each of the non-contact sensors comprises a magnet and a reed switch, and further wherein each of the followers comprises ferromagnetic material.

16. A method according to claim 11, wherein each of the drive systems comprises a hydraulic pump and a motor.

17. A method according to claim 11, wherein the mower comprises a riding mower including a seat switch to indicate when an operator is located on a seat of the mower, and further wherein the method comprises disabling the engine if the seat switch does not indicate that an operator is located on the seat and at least one of the drive systems is not in the neutral condition.

18. A method according to claim 11, wherein the mower comprises a riding mower including a parking brake switch to indicate when the parking brake is engaged, and further wherein the method comprises disabling the engine if the parking brake is engaged and at least one of the drive systems is not in the neutral condition.

19. A method according to claim 11, wherein the mower comprises a riding mower including a seat switch to indicate when an operator is located on a seat of the mower and a power take off switch to indicate when a mower deck of the mower is operating, and further wherein the method comprises enabling the motor only if the seat switch indicates that an operator is located on the seat, the power take off switch indicates that the mower deck is not operating, and the non-contact sensor indicates that the drive systems are in the neutral condition.

20. A method of interlocking a mower comprising:
   a) providing a mower having a drive system interlock operatively connected to an engine, two hydrostatic drive systems, and two driven wheels that are independently driven by each of the drive systems, the drive systems each having a neutral condition in which their respective driven wheels are not being driven, wherein one of the drive systems can be driven in forward while the other drive systems is driven reverse;
   b) independently controlling each of the drive systems with a separate control mechanism for shifting each of the drive systems between forward, reverse and the neutral condition independent of the other drive system, wherein each of the control mechanisms move each of the drive systems through the neutral condition when shifting the drive systems between forward and revere;
   c) sensing when each of the drive systems are in the neutral condition with a non-contact sensor for each of the drive systems; and
   d) providing a signal to the drive system interlock of the riding mower when the non-contact sensor sense that both of the drive systems are in the neutral condition.

21. A method according to claim 20, wherein each of the hydrostatic drive systems comprises a separate hydraulic pump and a motor.

22. A method according to claim 20, wherein the step of independently controlling each of the drive systems comprises moving a control lever and a follower that activates one of the non-contact sensors when the control lever is moved to a position corresponding to a neutral condition of the drive system.

23. A method according to claim 22, wherein each of the non-contact sensors comprises a magnetic and a reed switch, and further wherein each of the followers comprises ferromagnetic material.

* * * * *

UNITED STATES PATENT AND TRADEMARK OFFICE
CERTIFICATE OF CORRECTION

PATENT NO.: 6,056,074
DATED: May 2, 2000
INVENTOR(S): Heal et al.

It is certified that error appears in the above-identified patent and that said Letters Patent is hereby corrected as shown below:

Title page, Inventors, delete "Staples" and insert - -Stalpes- -;

Title page, Attorney, Agent or Firm, delete "Gerhardt," and insert - -Gebhardt- - ; and Column 8, line 25, after "wherein one of the" insert - -drive systems can be driven in forward while the other drive system is driven in- -.

Signed and Sealed this

Seventeenth Day of April, 2001

*Attest:*

NICHOLAS P. GODICI

*Attesting Officer*      Acting Director of the United States Patent and Trademark Office